March 25, 1952     C. W. HANSELL     2,590,405
SIGNAL TO NOISE RATIO OF RADAR SYSTEMS
Filed Aug. 13, 1946
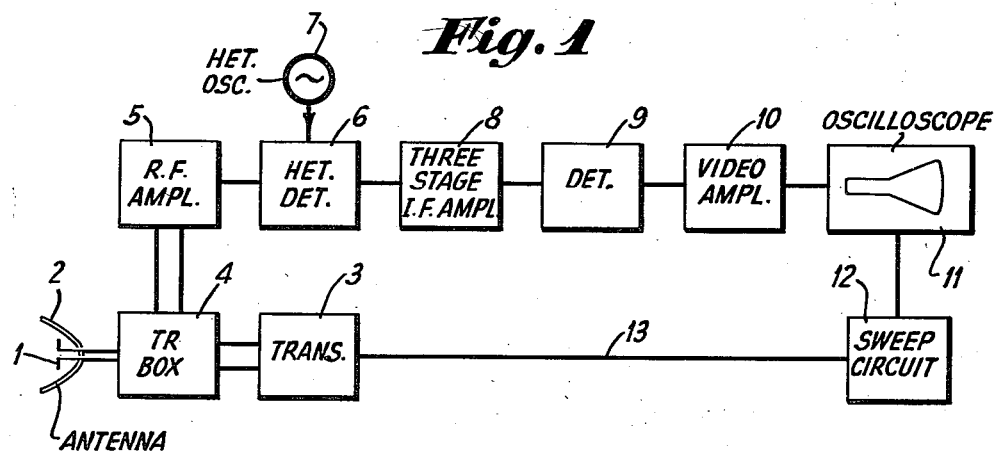
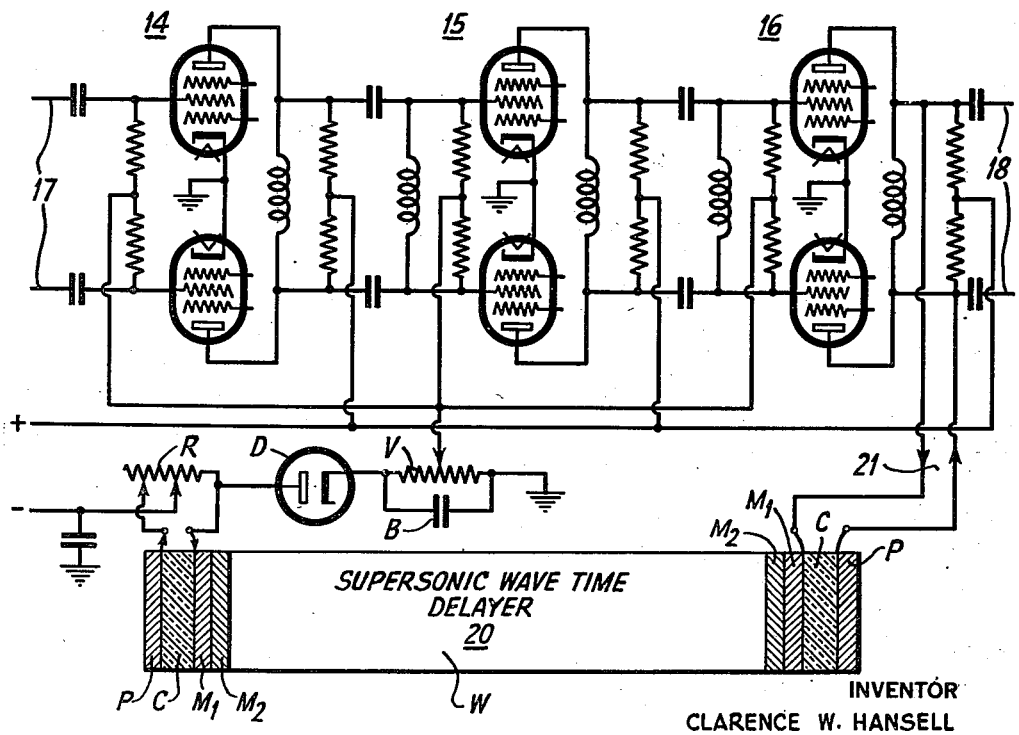
INVENTOR
CLARENCE W. HANSELL
BY
ATTORNEY Patented Mar. 25, 1952

2,590,405

UNITED STATES PATENT OFFICE 2,590,405

SIGNAL TO NOISE RATIO OF RADAR SYSTEMS

Clarence W. Hansell, Port Jefferson, N. Y., assignor to Radio Corporation of America, a corporation of Delaware Application August 13, 1946, Serial No. 690,134

8 Claims. (Cl. 343—5)

1

This invention relates to pulse receiving systems, and has for its primary object to provide a method of and means for regenerating or emphasizing desired received signal pulses with respect to receiver noise.

The invention finds especial application in radar systems, sometimes called radio range and detection or object locating systems, wherein it is desired to distinguish between recurring desired echo or reflected signal pulses and received noise pulses which occur at random intervals.

Hence, a particular object of the invention is to improve the signal-to-noise ratio in a pulse radar receiving system, as evidenced at the final indicator.

I have found that an improved signal-to-noise ratio is obtainable in pulse radar systems if the successive pulses representing a particular reflecting object are made to be regenerative in such a manner that earlier pulses increase and augment the response of the system to correspondingly positioned later pulses emanating from the same target. This is more or less analogous to regeneration in continuous wave circuits and introduces an equivalent increase in pulse rate frequency selectivity in a manner to improve the signal-to-noise ratio.

An important feature of the invention lies in the use of a supersonic wave time delayer by means of which I employ supersonic vibrational waves of relatively low velocities to increase the amplifier sensitivity at the right time to emphasize the desired signal pulses. This supersonic wave time delayer is in the form of a feed-back circuit in the amplifier portion of the system, but it should be understood that the feed-back energy is not itself amplified as is customary in common regenerative systems, but that the feedback modulates or controls or varies the gain or amplification according to the wave form of the envelope of the high frequency current. This supersonic wave time delayer provides a means of practical length for converting from electrical to vibrational mechanical waves and back again, and which is capable of passing waves modulated at rates up to several megacycles and which can operate at a suitable wave frequency.

A more detailed description follows in conjunction with a drawing wherein:

Fig. 1 illustrates, by way of example, a known form of pulse radar or object locating system to which the invention is applicable, and Fig. 2 illustrates in detail, the circuit elements constituting the invention and comprising one portion of the system of Fig. 1.

2

Referring to Fig. 1, there is shown a well known form of pulse radar system whose different stages are shown diagrammatically in box outline. This system includes an antenna 1, at the focus of a parabolic reflector 2 and which is fed by energy from a transmitter 3 via a TR box 4. The antenna and reflector are merely illustrative of any wave directive structure which can be employed. This antenna serves both to transmit pulses toward the object to be located and to receive pulses reflected back from the object after it has been located. The transmitter 3 may be any suitable form of ultra high frequency transmitter, such as a magnetron, which produces pulses of radio frequency energy occurring at desired time intervals. By way of example these pulses may have a duration of the order of one micro-second or less, and the repetition rate of these pulses may be 3,000 cycles per second or less, as a result of which the time intervals between adjacent pulses are not less than $1/3000$ of a second in order to be able to detect large objects at distances of about 30 miles. The TR box 4 is illustrative of any suitable apparatus for preventing the transmitted pulses from paralyzing the receiving end of the system and for enabling received pulses to pass efficiently to the receiving portion of the system at time intervals between transmitted pulses.

The receiving portion of the radar system of Fig. 1 comprises a radio frequency amplifier 5, a heterodyne detector or frequency converter 6 which is fed with oscillations from a local heterodyning oscillator 7, a three-stage intermediate frequency amplifier 8, a detector 9, a video amplifier 10 and a final indicator 11. This indicator 11 is normally a cathode ray oscilloscope having a sweep which is synchronized with the transmitted wave pulses and on which the useful signals due to returning pulses reflected from objects to be detected are made visible by a deflection of the electron beam at right angles to the sweep, or by a modulation in the strength of the beam. In order to synchronize the sweep of the oscilloscope 11 with the transmitted wave pulses, there is provided a suitable sweep circuit 12 which is controlled from the transmitter 3 over the connection 13. By way of example only, this sweep circuit 12 may be in the form of a saw-tooth voltage wave generator.

The invention is described in Fig. 2 which illustrates in detail the three-stage intermediate frequency amplifier 8 of Fig. 1. This intermediate frequency amplifier 8 comprises three push-pull connected vacuum tube stages 14, 15 and 16 arranged in cascade relationship. The input for the system of Fig. 2 is fed to the leads 17 extending to the heterodyne detector 6. The output from the system of Fig. 2 is passed on to leads 18 which extend to the final detector 9.

Between the last stage 16 and the second stage 15 of the intermediate frequency amplifier, there is provided a back-coupled circuit in the form of a supersonic wave time delayer 20 having an input circuit and an output circuit each comprising a platinum alloy wave stopping layer P which is one quarter of a wavelength thick, a piezo-electric quartz crystal C which is one-half wavelength thick for the intermediate frequency of operation, and two quarter-wave thick layers $M_1$ and $M_2$ which together comprise a broad band impedance matching circuit. The element W of the supersonic wave time delayer is illustrative of the wave path for the supersonic waves having a time of wave travel, when the time delays in the layers $M_1$ and $M_2$ are added, equal to the time periods per transmitted pulse in the radar system of Fig. 1. This wave path W may be a steel rod, or glass, or quartz, or any material having low attenuation for supersonic vibrational waves.

The supersonic wave time delayer 20 functions to convert electrical energy of alternating current at the intermediate frequency of operation impressed thereon from the output of the I. F. amplifier to vibrational mechanical waves which are then again converted back to electrical waves, in turn, rectified and the rectified energy impressed on the middle stage 15 of the I. F. amplifier. In order to minimize wave reflections at each end of the supersonic wave time delayer 20, there is provided between the delayer 20 and the piezo-electric crystals C, matching layers $M_1$, and $M_2$ each of which has a wave impedance which is the geometric means of the wave impedances desired at each of its faces and these layers have a thickness close to an odd integral number of quarter waves measured at the velocity of the waves in the layers. In order to minimize reflection over a larger band of frequencies, each layer $M_1$ and $M_2$ is only ¼ wave thick for wavelengths in the layer at the mean wave frequency. This method of impedance matching reduces reflections to a small value over an appreciable band of frequencies. As an illustration, of the media, namely, the piezo-electric crystal C and the wave path W have wave impedances of $\sqrt{Z_1}$ and $Z_2$, then next to the media with the wave impedance $Z_1$, there should be placed a quarter wave layer ($M_1$) with an impedance of $$Z_4 = \sqrt{Z_1 \sqrt{Z_1 Z_2}}$$

Next to the medium W of wave impedance, $Z_2$ and adjacent to the first quarter wave layer $M_1$, is a second quarter wave layer $M_2$ having a wave impedance of $$\sqrt{Z_5} = \sqrt{Z_2 \sqrt{Z_1 Z_2}}$$

The principles of this method of transferring waves from one transmitting medium to another and reducing mechanical wave reflections in the boundary between the two media through which the waves pass are described in my copending application, Serial No. 446,474, filed June 10, 1942, now U. S. Patent 2,430,013, granted November 4, 1947, to which reference is made. In effect the two layers $M_1$ and $M_2$ provide two successive equal ratio impedance transformations the product of which equals the total required impedance transformation between the impedance $Z_1$, of the crystal and impedance $Z_2$ of the wave path W. By using two impedance transforming layers, the reflections due to imperfect matchings by one layer in various parts of the frequency band, tend to be balanced out by corresponding reflections due to imperfect matchings by the other layer. The reflections at the faces of one layer take place nearly one quarter wave distant from corresponding reflections at the faces of the other layer and so nearly cancel out in the direction toward the source of the waves, over a broad band of frequencies.

It will be seen that in my supersonic wave time delayer, I am able to obtain a broad band modulation frequency response in converting A. C. electric power to traveling supersonic wave vibrational power. The time delayed A. C. electrical power of each time interval is utilized to augment the response of the system in corresponding time intervals of the next succeeding scan of the radio indicating oscilloscope. The signal power in the system produces increments which grow in amplitude with respect to random noise due to the feedback or back-coupled feature between the stages 16 and 15 of the intermediate frequency amplifier, and this larger amplitude lifts the signal out of the noise so that the signal is more easily visible to the operator, whereas without the feed-back feature of the present invention, the signals might not be detected at all or detected only by the exercise of diligence, concentration and great skill.

It should be understood that the supersonic wave time delayer 20 takes a portion of the intermediate frequency power fed to it from the output circuit of the last stage 16 via leads 21 and delays this power by an amount of time equal to the time intervals per pulse of transmitted power in the radar system. In this way, some of the energy of a signal pulse arriving during one time period of the repetition will be so delayed that it appears in the output of the time delayer 20 at impedance matching load resistor R simultaneously with the arrival of a corresponding signal pulse arriving at the next time period of the repetition.

The time delayed intermediate frequency power appearing across load resistor R in the output of the supersonic wave time delayer 20, or a portion of it, is rectified in a diode rectifier D to produce a D. C. potential envelope which follows the envelope of amplitude of the time delayed I. F. power. The varying D. C. potential from the rectifier D is then used to control and modulate the gain of the I. F. amplifier. As a result, the received signal pulses tend to cause the gain of the amplifier to increase progressively with successive repetitions but only during those particular time periods which are occupied by the signal pulses.

The rectifier D is preferably designed to have a square law of response of output rectified current with respect to intermediate I. F. current, in order that the signal currents may not be masked out by stronger noise currents in the rectifier.

It should be noted that in circuit with the cathode of rectifier D and connected between this rectifier D and the input to the amplifier 15, there is provided a resistor V shunted by a radio frequency bypass condenser B. The combination of loading due to rectifier D and its associated output elements V, B and the grids of stage 15 and also resistor R, is such as to substantially prevent reflection of supersonic waves from the output of time delayer 20 to the input of this time delayer through the delayer itself.

It should also be noted that the varying D. C. potential which is used to control and modulate the gain of the I. F. amplifier through the supersonic wave time delayer, is applied to the grids of push-pull tubes 15 in push-push whereas the output from the tubes 14 is applied to these grids in push-pull. This arrangement of supplying rectified output from the delayer through rectifier D in push-push relationship as compared to the feeding of I. F. carrier current through the system in push-pull fashion, is preferred from the standpoint of technical performance because it is a help in obtaining substantial amounts of feed-back without running into instability and perhaps oscillation in the amplifier system. It permits less smoothing to be used in the output circuit of the diode rectifier which is an aid to obtaining rapid or wide frequency response without oscillation in the receiver intermediate frequency circuits.

The system of Fig. 2 can tend to oscillate at the pulse repetition frequency if sufficient I. F. input current in the form of noise or other currents is present, and if the feed-back is too great. Therefore, a feed-back control in the form of a tap on the resistor V is provided by means of which the operator may keep the feed-back as much below the point of oscillation as is desired.

The terminal impedance matching load resistance R is made adjustable in order to prevent substantial supersonic wave reflections, or to provide control of the reflections if substantial delay in cessation of feed-back is desired after cessation or decrease in the signal pulses.

The attenuation in supersonic wave time delayer 20 is an aid in preventing undesirable effects due to the reflections of the ends or terminals of the delayer, when it is desired that cessation of signal pulses stop the feed-back effect as quickly as possible.

An important distinction between the operation of the present invention and the conventional feed-back circuit is that the feed-back circuit of the present invention has a time delay and modulates or controls the gain of the amplifier with the wave form of the envelope of the I. F. current, thus making the amplifier more sensitive at the right time so as to emphasize the desired signal pulses. The feed-back energy is not itself amplified as it is in common regenerative systems. I am thus able to modulate the gain of the system at very high frequencies. For example, if the repetition rate of the pulses is 3,000 cycles per second and the pulses are each of the order of 1 micro-second or less, then the band width may extend from 3,000 to 3,000,000 cycles per second. Hence the gain is modulated at all frequencies of 3,000 to 3,000,000 cycles per second if they are present as modulation of the I. F. current.

It will thus be seen that random noise, which generally sets the limit of range of radar systems, does not repeat its peaks at particular time intervals as the echo signals do if the target is stationary or slow moving, and so cannot cause a time selective increase of its amplitude as the timed signal pulses do. Therefore, the system makes use of the special characteristic of the received signal pulses, which is occurrence at particular substantially fixed time intervals in the successive repetitions to raise the signal up out of the noise, which noise does not have this special characteristic. The final result is closely analogous to a great increase in frequency selectivity in continuous wave systems but it is a kind of frequency selectivity which keeps signal pulses which are separated in time in their proper positions on the oscilloscope screen.

In practice, the supersonic wave time delayer 20 may be made adjustable if the element W is a liquid, but it is preferred that adjustment of the exact frequency of repetition of the transmitted pulses be made to match the time delay in the supersonic wave time delayer.

What is claimed is:

1. An electron discharge device system having a pair of vacuum tube stages connected in cascade, means for supplying alternating current energy to said first stage, a back-coupled circuit between the output of said second stage and the input of said first stage, said back-coupled circuit converting the alternating current output from said second stage to supersonic mechanical vibrational waves and then converting said mechanical waves back to alternating current wave energy, and a rectifier connected between the output of said back-coupled circuit and the input of said first stage, whereby direct current potential is used to control the gain of said first stage.

2. An amplifier system comprising first and second push-pull connected stages coupled together in cascade, means for supplying alternating current energy to said first stage, a back-coupled circuit between the output of said second stage and the input of said first stage, said back-coupled circuit converting the alternating current output from said second stage to supersonic mechanical waves and then converting said mechanical waves back to alternating current wave energy, said back-coupled circuit being so constructed and arranged as to provide a desired time delay therein for power passing therethrough, a rectifier connected between the output of said back-coupled circuit and the input of said first stage, the connections from said rectifier to said first stage being such that the rectified power is applied to said first stage in push-push.

3. An amplifier system comprising first, second and third vacuum tube stages connected in cascade, means for supplying alternating current energy to said first stage, a back-coupled circuit between the output of said third stage and the input of said second stage, said back-coupled circuit having means for converting electrical waves to mechanical waves and then back again to electrical waves and being so constructed and arranged as to provide a desired time delay for power passing therethrough, and a rectifier between the output of said last means and the input of said second stage.

4. An amplifier system comprising first, second and third vacuum tube stages connected in cascade, means for supplying alternating current energy to said first stage, a back-coupled circuit between the output of said third stage and the input of said second stage, said back-coupled circuit having means for converting electrical waves to mechanical waves and then back again to electrical waves and being so constructed and arranged as to provide a desired time delay for power passing therethrough, an adjustable impedance matching terminal impedance, a rectifier and a back-coupled control connection, in the order named, between the output of said last-named means and the input of said second stage.

5. Means for improving the signal to noise ratio in radar systems adapted to receive repetitive signals comprising an amplifier, a supersonic wave delayer for time delaying a portion of the output wave energy of the amplifier and a rectifier for the time delayed energy, output from which varies the amplification of the amplifier.

6. An electron discharge device system having a pair of vacuum tube stages connected in cascade, means for supplying alternating current energy to said first stage, a back-coupled circuit between the output of said second stage and the input of said first stage, said back-coupled circuit converting the alternating current output from said second stage to supersonic mechanical vibrational waves and then converting said mechanical waves back to alternating current wave energy, and the series circuit of an adjustable impedance matching load resistor and a rectifier connected between the output of said back-coupled circuit and the input of said first stage, whereby direct current potential is used to control the gain of said first stage.

7. An amplifier system comprising first and second push-pull connected stages coupled together in cascade, means for supplying alternating current energy to said first stage, a back-coupled circuit between the output of said second stage and the input of said first stage, said back-coupled circuit converting the alternating current output from said second stage to supersonic mechanical waves and then converting said mechanical waves back to alternating current wave energy, said back-coupled circuit providing a desired time delay therein for energy passing therethrough, an adjustable impedance matching load resistor at the output end of said back-coupled circuit, and a rectifier in series with a resistor connected between said impedance matching load resistor and the input of said first stage for supplying rectified current to said first stage in push-push.

8. An amplifier system comprising first and second push-pull connected stages coupled together in cascade, means for supplying alternating current energy to said first stage, a back-coupled circuit between the output of said second stage and the input of said first stage, said back-coupled circuit converting the alternating current output from said second stage to supersonic mechanical waves and then converting said mechanical waves back to alternating current wave energy, said back-coupled circuit providing a desired time delay therein for energy passing therethrough, an adjustable impedance matching load resistor at the output end of said back-coupled circuit, and a rectifier in series with a resistor connected between said impedance matching load resistor and a point of reference potential, an adjustable tap for said last resistor which is in series with said rectifier, and a connection from said adjustable tap to the input of said first stage for supplying rectified current thereto in push-push.

CLARENCE W. HANSELL.

REFERENCES CITED

The following references are of record in the file of this patent:

UNITED STATES PATENTS

| Number | Name | Date |
| --- | --- | --- |
| 2,263,902 | Percival | Nov. 25, 1941 |
| 2,310,692 | Hansell | Feb. 9, 1943 |
| 2,361,437 | Trevor | Oct. 31, 1944 |
| 2,412,995 | Levy | Dec. 24, 1946 |
| 2,416,337 | Mason | Feb. 25, 1947 |
| 2,425,315 | Atwood | Aug. 12, 1947 |
| 2,434,255 | Bond | Jan. 13, 1948 |
| 2,435,960 | Fyler | Feb. 17, 1948 |
| 2,445,584 | Ramo | July 20, 1948 |
| 2,487,995 | Tucker | Nov. 15, 1949 |
| 2,505,364 | McSkimin | Apr. 25, 1950 |